(12) United States Patent
Saji et al.

(10) Patent No.: US 9,255,630 B2
(45) Date of Patent: Feb. 9, 2016

(54) ADVANCING/RETRACTING ACTUATION DEVICE WITH MESHING CHAIN

(75) Inventors: Tomoyuki Saji, Osaka (JP); Keisuke Murakami, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 246 days.

(21) Appl. No.: 13/981,045

(22) PCT Filed: Dec. 27, 2011

(86) PCT No.: PCT/JP2011/080166
§ 371 (c)(1),
(2), (4) Date: Jul. 22, 2013

(87) PCT Pub. No.: WO2012/101945
PCT Pub. Date: Aug. 2, 2012

(65) Prior Publication Data
US 2013/0298705 A1    Nov. 14, 2013

(30) Foreign Application Priority Data

Jan. 27, 2011   (JP) .................................. 2011-015066

(51) Int. Cl.
*F16G 13/20* (2006.01)
*F16H 19/04* (2006.01)
*B66F 3/06* (2006.01)

(52) U.S. Cl.
CPC *F16H 19/04* (2013.01); *B66F 3/06* (2013.01); *F16G 13/20* (2013.01); *Y10T 74/18096* (2015.01)

(58) Field of Classification Search
CPC ....... F16G 13/20; F16G 9/00; F16H 19/0636; B66F 3/06; B66F 13/005
USPC ......................................................... 59/78.1
See application file for complete search history.

(56) References Cited

U.S. PATENT DOCUMENTS

| 3,645,146 A | 2/1972 | Nagin |
| 5,355,643 A | 10/1994 | Bringolf |

(Continued)

FOREIGN PATENT DOCUMENTS

| CA | 2070284 | 4/1992 |
| EP | 0799788 | 10/1997 |

(Continued)

OTHER PUBLICATIONS

International Search Report prepared by the Japanese Patent Office on Jan. 17, 2012, for International Application No. PCT/JP2011/078679.

(Continued)

*Primary Examiner* — David B Jones
(74) *Attorney, Agent, or Firm* — Sheridan Ross P.C.

(57) ABSTRACT

An interlocking chain type forward and backward actuating device is provided that does not increase workload involved in assembling the device, adjusting the rotation phase, and servicing and maintaining the device. The device is capable of smoothly actuating a driven body by advancing and retracting the body, and of preventing any pulsation or the like of the meshing chain. The interlocking chain type forward and backward actuating device includes chain-guide grooves formed so as to equalize an interlocked-state pin-to-pin distance (D1) between a pair of connecting pins that face each other in a chain interlocking imaginary plane (S) and a rigid-state pin-to-pin distance (D2) between a pair of connecting pins.

4 Claims, 8 Drawing Sheets

(56) References Cited

U.S. PATENT DOCUMENTS

| | | | |
|---|---|---|---|
| 7,819,389 B2* | 10/2010 | Takeuchi et al. ............... | 254/358 |
| 7,921,986 B2 | 4/2011 | Ando | |
| 8,453,994 B2* | 6/2013 | Suko et al. .................... | 254/358 |
| 8,984,975 B2* | 3/2015 | Saji et al. ....................... | 74/89.2 |
| 2006/0219144 A1 | 10/2006 | Phelan et al. | |
| 2009/0166155 A1 | 7/2009 | Hishioka et al. | |
| 2010/0059727 A1 | 3/2010 | Suko | |
| 2010/0140572 A1 | 6/2010 | Aoki | |
| 2010/0229469 A1 | 9/2010 | Kanehira | |
| 2013/0276422 A1 | 10/2013 | Saji | |
| 2013/0283945 A1 | 10/2013 | Kaisaku et al. | |
| 2013/0312554 A1* | 11/2013 | Saji et al. ..................... | 74/89.21 |

FOREIGN PATENT DOCUMENTS

| | | |
|---|---|---|
| JP | S51-131060 | 11/1976 |
| JP | S64-058883 | 3/1989 |
| JP | H03-012646 | 1/1991 |
| JP | 59947/1991 | 1/1993 |
| JP | H05-3300 | 1/1993 |
| JP | H06-13399 | 4/1994 |
| JP | 09-119495 | 5/1997 |
| JP | 11-278797 | 10/1999 |
| JP | 2009-255997 | 10/1999 |
| JP | 3384491 | 12/2002 |
| JP | 2007-269414 | 10/2007 |
| JP | 2008-256202 | 10/2008 |
| JP | 2009-001398 | 1/2009 |
| JP | 2009-113872 | 5/2009 |
| JP | 2009-242010 | 10/2009 |
| JP | 2010-047384 | 3/2010 |
| JP | 2010-065721 | 3/2010 |
| JP | 2010-138926 | 6/2010 |
| JP | 2011-144832 | 7/2011 |
| WO | WO 92/07154 | 4/1992 |
| WO | WO 2011/062190 | 5/2011 |

OTHER PUBLICATIONS

International Search Report prepared by the Japanese Patent Office on Mar. 13, 2012, for International Application No. PCT/JP2011/078755.

International Search Report prepared by the Japanese Patent Office on Apr. 17, 2012, for International Application No. PCT/JP2011/080160.

International Search Report prepared by the Japanese Patent Office on Jun. 12, 2012, for International Application No. PCT/JP2012/056703.

International Search Report prepared by the Japanese Patent Office on Jul. 17, 2012, for International Application No. PCT/JP2012/061567.

International Search Report prepared by the Japanese Patent Office on Apr. 17, 2012, for International Application No. PCT/JP2011/080166.

Extended European Search Report for European Patent Application No. 11857348.4, mailed Jul. 25, 2014, 8 pages.

* cited by examiner

ADVANCING/RETRACTING ACTUATION DEVICE WITH MESHING CHAIN

CROSS REFERENCE TO RELATED APPLICATIONS

This application is a National Stage Application under 35 U.S.C. 371 and claims the benefit of PCT Application No. PCT/JP2011/080166 having an international filing date of 27 Dec. 2011, which designated the United States, and which PCT application claimed the benefit of Japanese Patent Application No. 2011-015066 filed on 27 Jan. 2011, the entire disclosures of which is incorporated by reference herein.

FIELD OF THE INVENTION

The present invention relates to a drive unit used in manufacturing facilities in various manufacturing fields, transportation facilities in the transportation field, nursing care facilities in medical and welfare fields, and stage facilities in art fields, and advancing and retreating a driven body such as a workpiece in parallel to an installation face, in particular, to an interlocking chain type forward and backward actuating device using interlocking chains as drive media for advancing/retreating movement.

BACKGROUND OF THE INVENTION

Conventionally, as a drive unit, an interlocking chain type lifting apparatus has been known that moves a workpiece such as a heavy material by using a pair of lifting interlocking chains interlocked with each other and integrally moved vertically (for example, refer to Patent Document 1).

The pair of lifting interlocking chains used in this conventional interlocking chain type lifting apparatus is designed to be driven by a pair of lifting sprockets, which are arranged to face the pair of lifting interlocking chains, respectively.

PRIOR ART DOCUMENTS

Patent Documents

Patent Document 1: Japanese Laid-Open Patent Publication No. 2009-255997 (Claims, FIG. 3)

SUMMARY OF THE INVENTION

However, the conventional interlocking chain type lifting apparatus 800 has problems in apparatus assembly and maintenance as shown in FIG. 8. Specifically, to engage a pair of lifting interlocking chains 810 with each other at a right timing by synchronizing rotation phases of a pair of lifting sprockets 820 with each other, an operation for adjusting the rotation phases involves an excessively heavy work burden.

Also, the conventional interlocking chain type lifting apparatus 800 is designed to rotate the pair of lifting sprockets 820 in a state where the lifting sprockets 820 are installed on both the left and right of the pair of lifting interlocking chains 810 arranged adjacent to each other to engage the pair of lifting interlocking chains 810 with each other and advance and retreat the chains in the same direction. The apparatus has problems in apparatus assembly and maintenance in that when the apparatus is entirely driven by a single drive source (not illustrated) such as an electric motor, the work burden to install a gear group 853 that interlocks rotary shafts 821 of the pair of lifting sprockets 820 with each other is increased. Further, the apparatus configuration becomes complicated, and this involves an excessively heavy work burden on apparatus assembly and maintenance.

Also, in the conventional interlocking chain type lifting apparatus 800, when the above-described gear group 853 is composed of a pair of gears 853a attached to the respective rotary shafts 821 of the lifting sprockets 820, as shown in FIG. 8, the diameter of the gears 853a are inevitably larger than the diameter of the lifting sprockets 820 because the lifting interlocking chains 810 are arranged between the pair of lifting sprockets 820. Thus, the gear group 853 larger in diameter than the lifting sprockets 820 obstructs advancing/retreating movement of a driven body such as a workpiece near the installation surface of the interlocking chain type lifting apparatus 800.

In addition, in the region in which the lifting interlocking chain 810 is driven from the chain bifurcating direction to the chain interlocking direction while being tilted by the lifting sprocket 820, that is, in the region in which the lifting interlocking chain 810 is wound around the lifting sprocket 820, known chordal action (polygonal action) occurs on the lifting interlocking chain 810, so that a problem occurs in apparatus driving which causes the lifting interlocking chain 810 to pulsate (move up and down), vibrate, make noise, and fluctuate in speed.

Accordingly, a technical problem to be solved by the present invention, that is, an object of the present invention is to provide an interlocking chain type forward and backward actuating device that avoids an increase in work burden on apparatus assembly, adjustment of rotation phases, and maintenance, smoothly advances and retreats a driven body near an installation surface, and avoids pulsation (up-down movement), vibration, noise, and speed fluctuation of the interlocking chains.

The invention of claim 1 solves the above described problems by providing an interlocking chain type forward and backward actuating device comprising a pair of interlocking chains, a drive sprocket, and a chain guide. The interlocking chains are each composed by coupling, in the chain longitudinal direction, a great number of pairs of hook-shaped inner tooth plates spaced from each other in the chain width direction and a great number of pairs of hook-shaped outer tooth plates arranged adjacent to the outer sides of the hook-shaped inner tooth plates in the chain width direction by pairs of front and rear connecting pins. The interlocking chains are integrally made rigid to form a rigid chain part in a state where the interlocking chains are interlocked with each other and arranged to face each other. The interlocking chains are disengaged from each other to bifurcate. The drive sprocket engages with a first one of the pair of interlocking chains from a side position of the pair of interlocking chains to freely advance and retreat the pair of interlocking chains. The chain guide has chain guide grooves that interlock a second one of the interlocking chains with the first interlocking chain by a chain positioning guide portion provided in the fork region of the pair of interlocking chains to drive the second interlocking chain so as to follow the first interlocking chain. The connecting pins of the first interlocking chain include a first connecting pin. The first connecting pin is positioned on the drive sprocket side in a state where the first interlocking chain is engaged with sprocket teeth of the drive sprocket in a chain interlocking imaginary plane that is orthogonal to the driving direction of the rigid chain part and includes a drive shaft of the drive sprocket. The connecting pins of the second interlocking chain include a second connecting pin facing the first connecting pin along the chain interlocking imaginary plane. A distance that exists between the first connecting pin and the second connecting pin is defined as an interlocked-state pinto-pin distance. The connecting pins in the rigid chain part include a pair of connecting pins facing each other while being parallel to the chain interlocking imaginary plane, a distance that exists between these pins being defined as a rigid-state pin-to-pin distance. The chain guide grooves are formed such that the interlocked-state pin-to-pin distance is equal to the rigid-state pin-to-pin distance.

The invention of claim 2 solves the above described problems by providing, in addition to the configuration of claim 1, a configuration in which the chain positioning guide portion extends straight to a hollow region of the rigid chain part.

The invention of claim 3 solves the above described problems by providing, in addition to the configuration of claim 2, a configuration in which the length of the straight extending portion extending to the hollow region from the chain engagement imaginary plane of the chain positioning guide portion is equal to or longer than a pin-to-pin distance between the pair of front and rear connecting pins.

The invention of claim 4 solves the above described problems by providing, in addition to the configuration of claim 3, a configuration in which the length of the straight extending portion is twice or more as long as the pin-to-pin distance between the pair of front and rear connecting pins.

An interlocking chain type forward and backward actuating device according to claim 1 of the present invention includes a pair of interlocking chains, a drive sprocket, and a chain guide. The interlocking chains are each composed by coupling, in the chain longitudinal direction, a great number of pairs of hook-shaped inner tooth plates spaced from each other in the chain width direction and a great number of pairs of hook-shaped outer tooth plates arranged adjacent to the outer sides of the hook-shaped inner tooth plates in the chain width direction by pairs of front and rear connecting pins. The interlocking chains are integrally made rigid to form a rigid chain part in a state where the interlocking chains are interlocked with each other and arranged to face each other. The interlocking chains are disengaged from each other to bifurcate. The drive sprocket engages with a first one of the pair of interlocking chains from a side position of the pair of interlocking chains to freely advance and retreat the pair of interlocking chains. The chain guide has chain guide grooves that interlock a second one of the interlocking chains with the first interlocking chain by a chain positioning guide portion provided in the fork region of the pair of interlocking chains to drive the second interlocking chain so as to follow the first interlocking chain. Thus, not only can the driven body be advanced/retreated according to advancing/retreating movement of the pair of interlocking chains, but also particular effects corresponding to specific configurations as below can be exerted.

More specifically, in the interlocking chain type forward and backward actuating device according to claim 1, the connecting pins of the first interlocking chain include a first connecting pin. The first connecting pin is positioned on the drive sprocket side in a state where the first interlocking chain is engaged with sprocket teeth of the drive sprocket in a chain interlocking imaginary plane that is orthogonal to the driving direction of the rigid chain part and includes a drive shaft of the drive sprocket. The connecting pins of the second interlocking chain include a second connecting pin facing the first connecting pin along the chain interlocking imaginary plane. A distance that exists between the first connecting pin and the second connecting pin is defined as an interlocked-state pin-to-pin distance. The connecting pins in the rigid chain part include a pair of connecting pins facing each other while being parallel to the chain interlocking imaginary plane. A distance that exists between these pins is defined as a rigid-state pin-to-pin distance. The chain guide grooves are formed such that the interlocked-state pin-to-pin distance is equal to the rigid-state pin-to-pin distance. Thus, the interlocking chains are driven by the drive sprocket engaging with the first interlocking chain. The hook-shaped inner tooth plates are meshed with each other, and the hook-shaped outer tooth plates are meshed with each other. The interlocking chains are driven in the rigid chain direction to smoothly complete the movement for meshing between the hook-shaped inner tooth plates and the movement for meshing between the hook-shaped outer tooth plates. Therefore, an increase in work burden on actuator assembly, adjustment of rotation phases, and maintenance is avoided. Also, the driven body is smoothly advanced and retreated near the installation surface, and occurrence of pulsation (up-down movement), vibration, noise, and speed fluctuation of the interlocking chains is avoided.

The interlocking chain type forward and backward actuating device according to claim 2 of the present invention is configured to have the following effects in addition to the effects exerted by the interlocking chain type forward and backward actuating device according to claim 1. That is, the chain positioning guide portion extends straight to a hollow region of the rigid chain part, whereupon the chain positioning guide portion supports not only chain disengaged portions bifurcated by disengagement between the pair of interlocking chains, but also the rigid chain part in which the pair of interlocking chains are interlocked with each other and made rigid. Thus, occurrence of pulsation (up-down movement), vibration, noise, and speed fluctuation of the interlocking chains can be more reliably avoided by guiding the pair of interlocking chains until the pair of interlocking chains are made rigid from the state where the chains are disengaged from each other.

The interlocking chain type forward and backward actuating device according to claim 3 of the present invention is configured to have the following effects in addition to the effect exerted by the interlocking chain type forward and backward actuating device according to claim 2. That is, the length of the straight extending portion extending to the hollow region from the chain engagement imaginary plane of the chain positioning guide portion is equal to or longer than a pin-to-pin distance between the pair of front and rear connecting pins. Thus, the straight extending portion guides the rigid chain part in the range of the pin-to-pin distance between the pair of front and rear connecting pins, so that the interlocking chains can be more smoothly driven. Also, occurrence of pulsation (up-down movement), vibration, noise, and speed fluctuation of the interlocking chains can be more reliably avoided as compared with the case where the pair of interlocking chains are guided only in the range until the pair of interlocking chains are interlocked with each other.

The interlocking chain type forward and backward actuating device according to claim 4 of the present invention is configured to have the following effects in addition to the effect exerted by the interlocking chain type forward and backward actuating device according to claim 3. That is, the length of the straight extending portion is twice or more as long as the pin-to-pin distance between the pair of front and rear connecting pins. Thus, the side surface of the straight extending portion is made to face three or more connecting pins in the rigid chain direction to support these connecting pins directly or indirectly via bushings or rollers. Accordingly, the interlocking chains are more reliably and smoothly driven, and occurrence of pulsation (up-down movement), vibration, noise, and speed fluctuation of the interlocking chains is more reliably avoided.

DETAILED DESCRIPTION OF THE PREFERRED EMBODIMENTS

Figure 1:
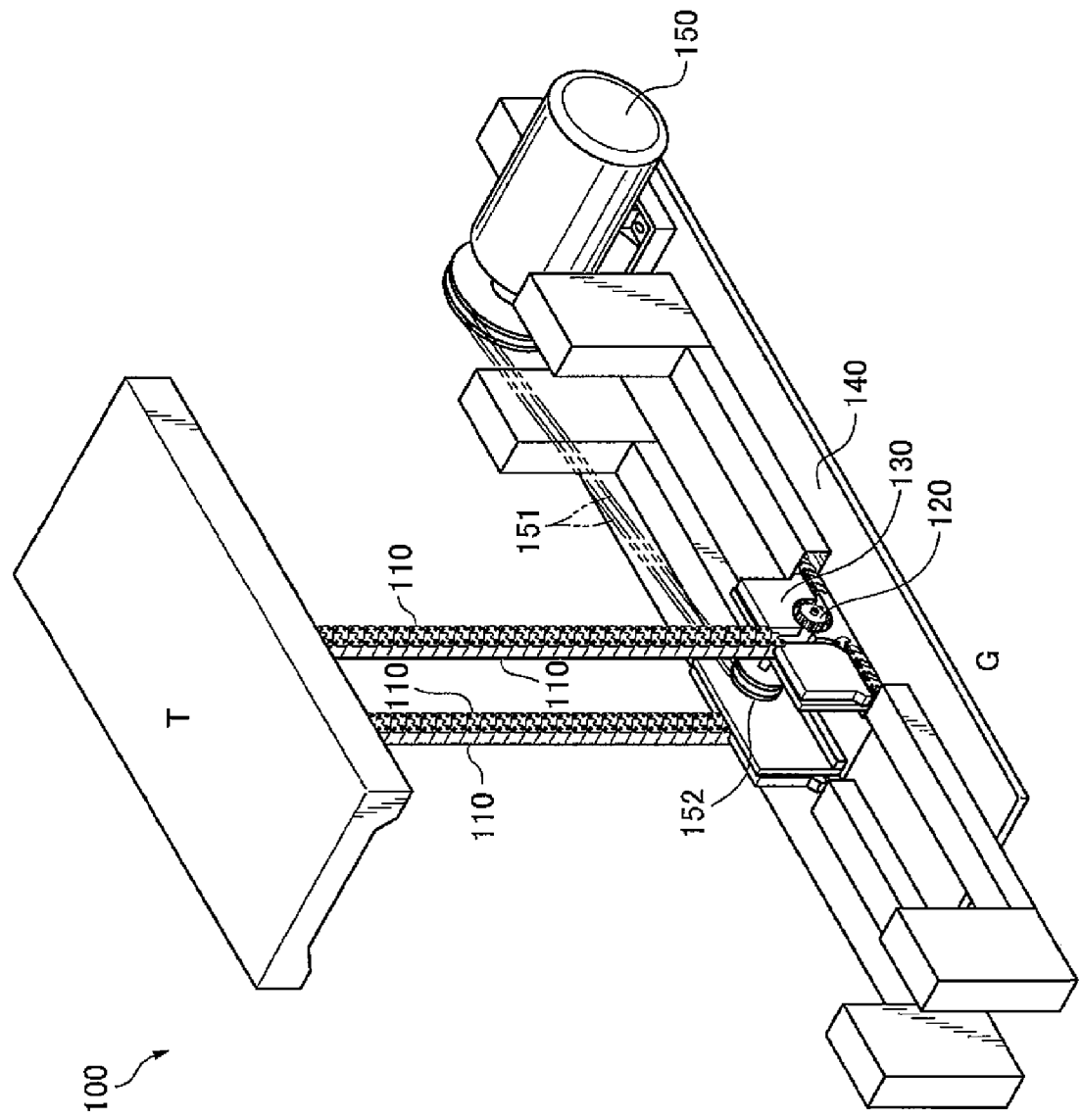
FIG. 1 is a general perspective view of an interlocking chain type forward and backward actuating device according to one embodiment of the present invention.

An interlocking chain type forward and backward actuating device according to the present invention includes a pair of interlocking chains, a drive sprocket, and a chain guide. The interlocking chains are each composed by coupling, in the chain longitudinal direction, a great number of pairs of hook-shaped inner tooth plates spaced from each other in the chain width direction and a great number of pairs of hook-shaped outer tooth plates arranged adjacent to the outer sides of the hook-shaped inner tooth plates in the chain width direction by pairs of front and rear connecting pins. The interlocking chains are integrally made rigid to form a rigid chain part in a state where the interlocking chains are interlocked with each other and arranged to face each other. The interlocking chains are disengaged from each other to bifurcate. The drive sprocket engages with a first one of the pair of interlocking chains from a side position of the pair of interlocking chains to freely advance and retreat the pair of interlocking chains. The chain guide has chain guide grooves that interlock a second one of the interlocking chains with the first interlocking chain by a chain positioning guide portion provided in the fork region of the pair of interlocking chains to drive the second interlocking chain so as to follow the first interlocking chain. The connecting pins of the first interlocking chain include a first connecting pin. The first connecting pin is positioned on the drive sprocket side in a state where the first interlocking chain is engaged with sprocket teeth of the drive sprocket in a chain interlocking imaginary plane that is orthogonal to the driving direction of the rigid chain part and includes a drive shaft of the drive sprocket. The connecting pins of the second interlocking chain include a second connecting pin facing the first connecting pin along the chain interlocking imaginary plane. A distance that exists between the first connecting pin and the second connecting pin is defined as an interlocked-state pin-to-pin distance. The connecting pins in the rigid chain part include a pair of connecting pins facing each other while being parallel to the chain interlocking imaginary plane, a distance that exists between these pins being defined as a rigid-state pin-to-pin distance. The chain guide grooves are formed such that the interlocked-state pin-to-pin distance is equal to the rigid-state pin-to-pin distance. Thus, an increase in work burden on actuator assembly, adjustment of rotation phases, and maintenance is avoided. Also, the driven body is smoothly advanced and retreated near the installation surface. Further, occurrence of pulsation (up-down movement), vibration, noise, and speed fluctuation of the interlocking chains is avoided.

For example, the pair of interlocking chains used in the interlocking chain type forward and backward actuating device according to the present invention may have any form as long as the interlocking chains are integrated by being interlocked with each other and bifurcate from each other by being disengaged from each other. For example, the interlocking chain may be composed of a single row in the chain width direction or two or more rows in the chain width direction. It is more preferable that the interlocking chain is composed of two or more rows in the chain width direction. The hook-shaped outer tooth plates and the hook-shaped inner tooth plates constituting a first one of the pair of interlocking chains are multiplexed and firmly interlocked in hook forms with the hook-shaped outer tooth plates and the hook-shaped inner tooth plates constituting a second one of the interlocking chain facing the first interlocking chain in a plurality of rows in the chain width direction. Thus, buckling frequently occurring in the chain width direction of the interlocking chains can be reliably restrained and excellent chain durability is realized.

The pair of interlocking chains used in the interlocking chain type forward and backward actuating device according to the present invention may be any of interlocking chains having no rollers, that is, having only bushings, or having rollers. When interlocking chains having only bushings are used, the number of chain components is reduced and the chain weight can be reduced.

As long as capable of smoothly guiding interlocking chains, the chain guide used in the interlocking chain type forward and backward actuating device according to the present invention may be formed to move a pair of left and right interlocking chains forward or backward along asymmetrical loci. If the chain guide has a chain guiding face having the same diameter as the root circle of the drive sprocket, the pair of the interlocking chains are moved forward and backward along symmetrical loci. Thus, smooth meshing and disengaging of the interlocking chains are achieved.

The interlocking chain type forward and backward actuating device according to the present invention has no trouble in vertical movements, with regard to an installation face, when the device is installed on a floor face as stationary installation or suspended from a ceiling face as suspended installation. Further, the device has no trouble in advancing and retreating movements corresponding to the above-described vertical movements when the device is installed on a vertical wall face as cantilever-supported installation.

EXAMPLE

Hereinafter, an interlocking chain type forward and backward actuating device of one embodiment of the present invention will be described based on the drawings.

Figure 2:
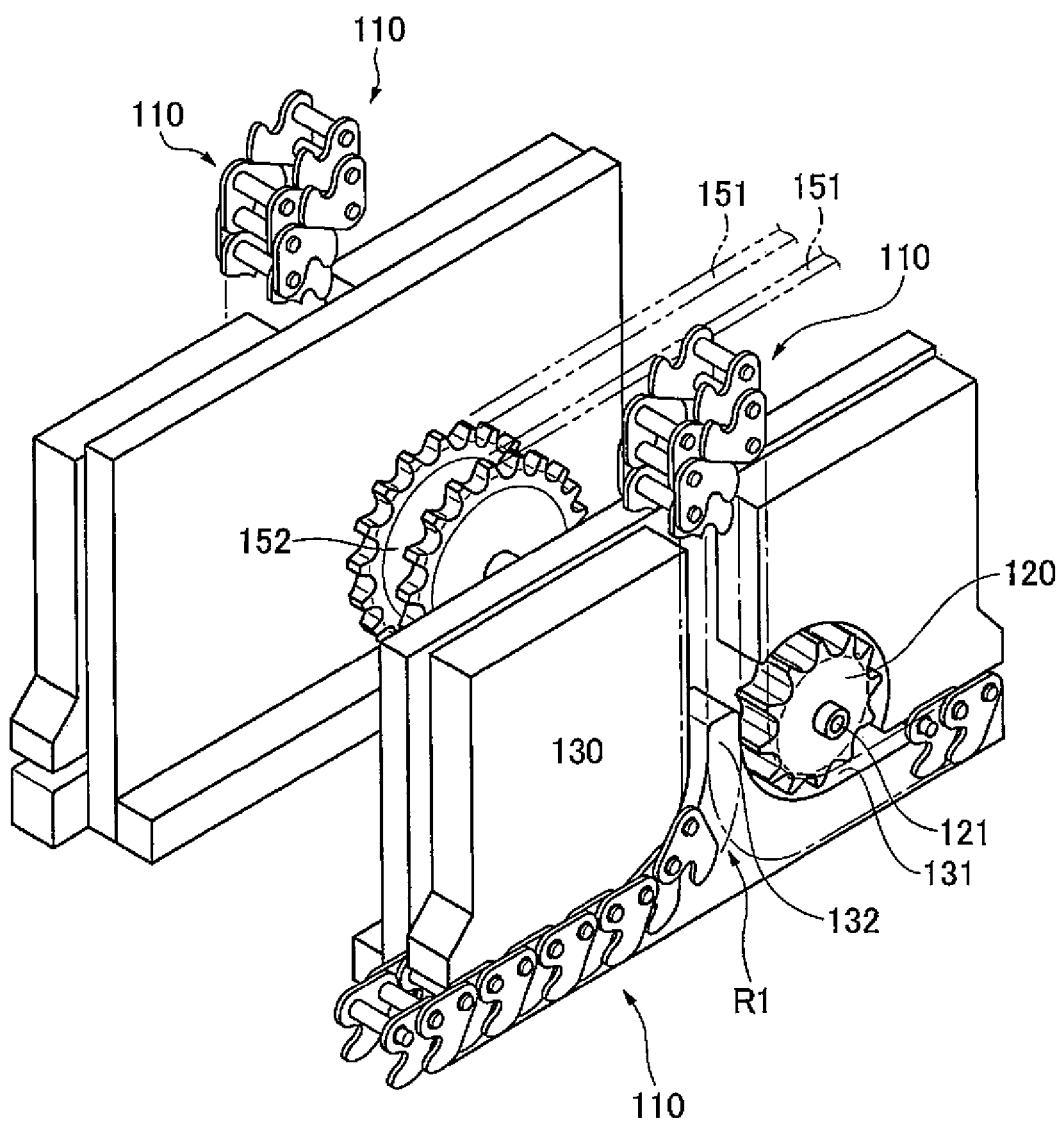
FIG. 2 is a partially enlarged view of the vicinity of a drive sprocket and interlocking chains shown in FIG. 1.
Figure 3:
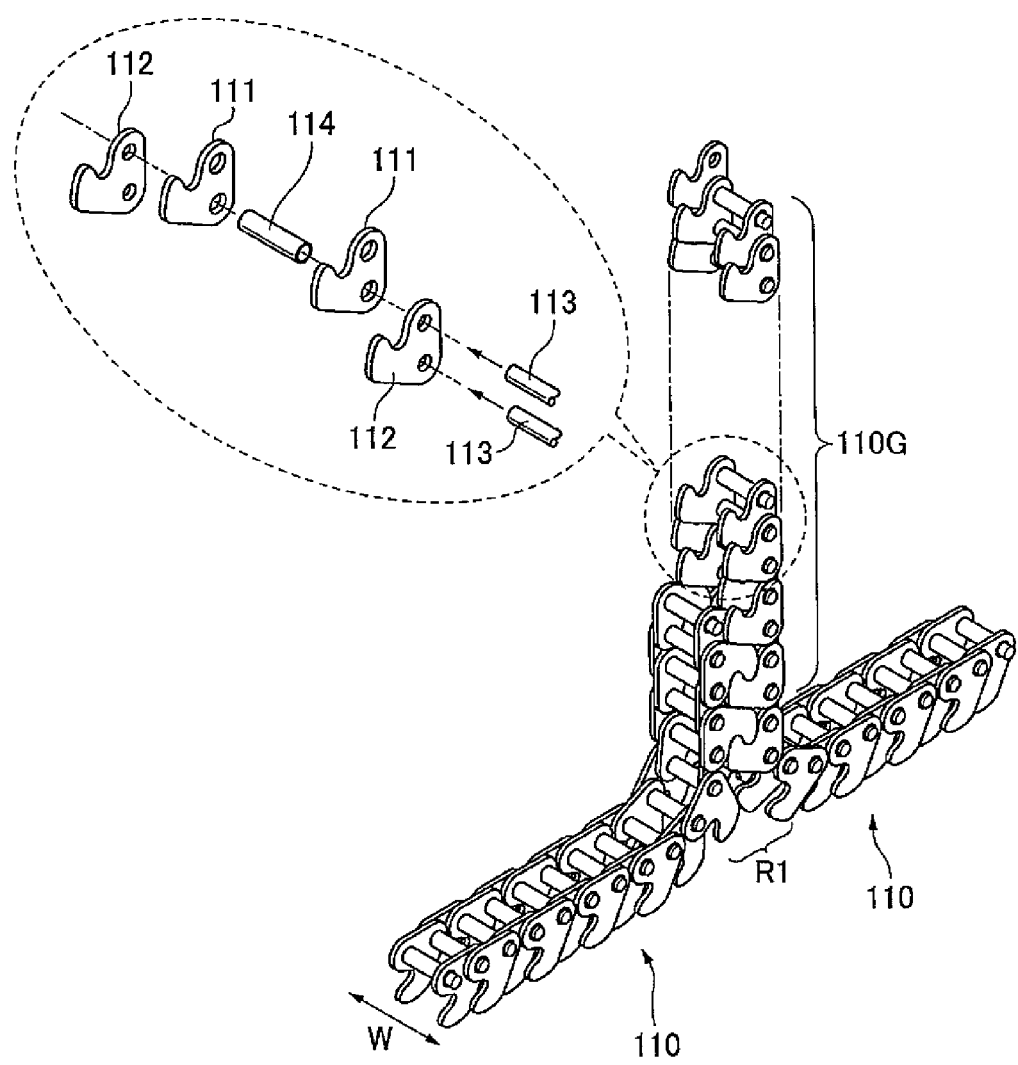
FIG. 3 is a perspective view showing an exploded state and a disengaged state of the interlocking chains.
Figure 4:
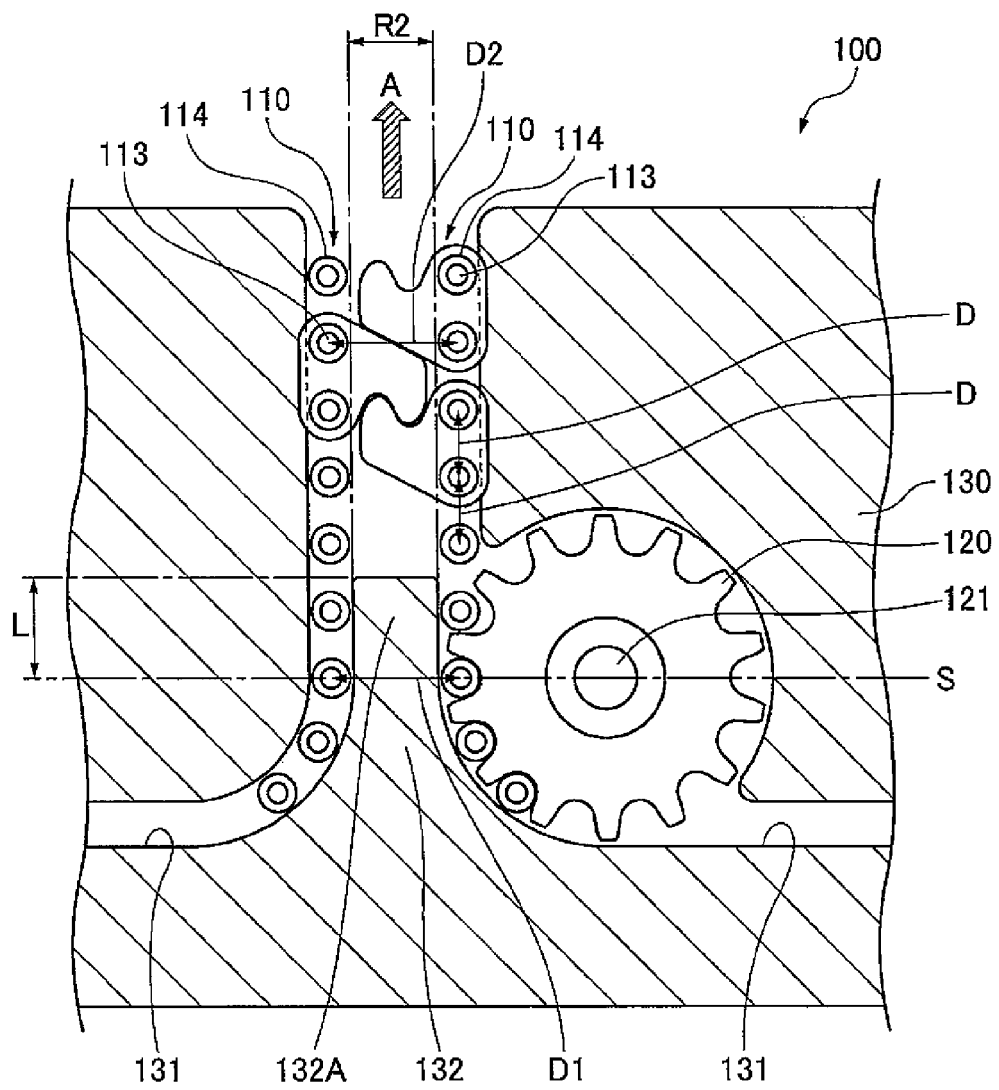
FIG. 4 is a partially enlarged view of the vicinity of the drive sprocket and the interlocking chains shown in FIG. 1.
Figure 5:
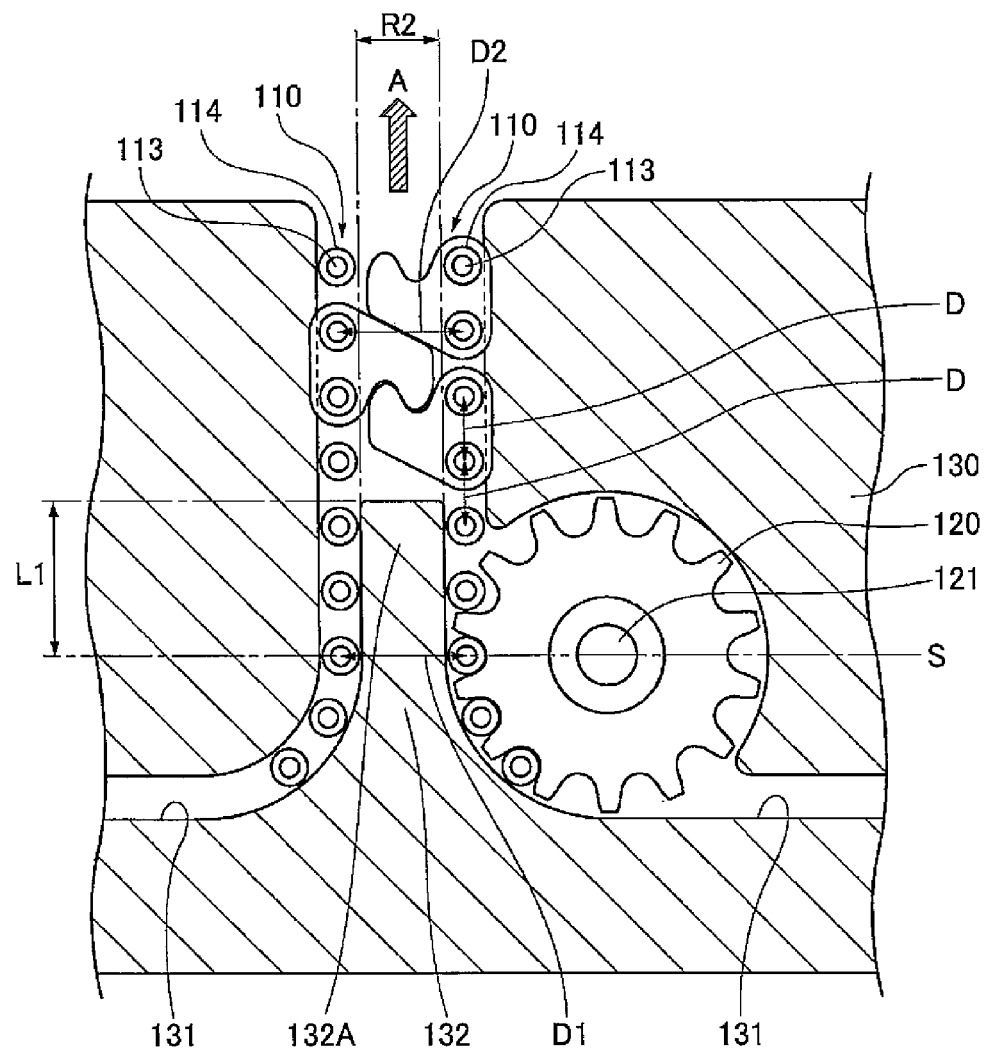
FIG. 5 is a partially enlarged view corresponding to FIG. 4, illustrating a first modification.
Figure 6:
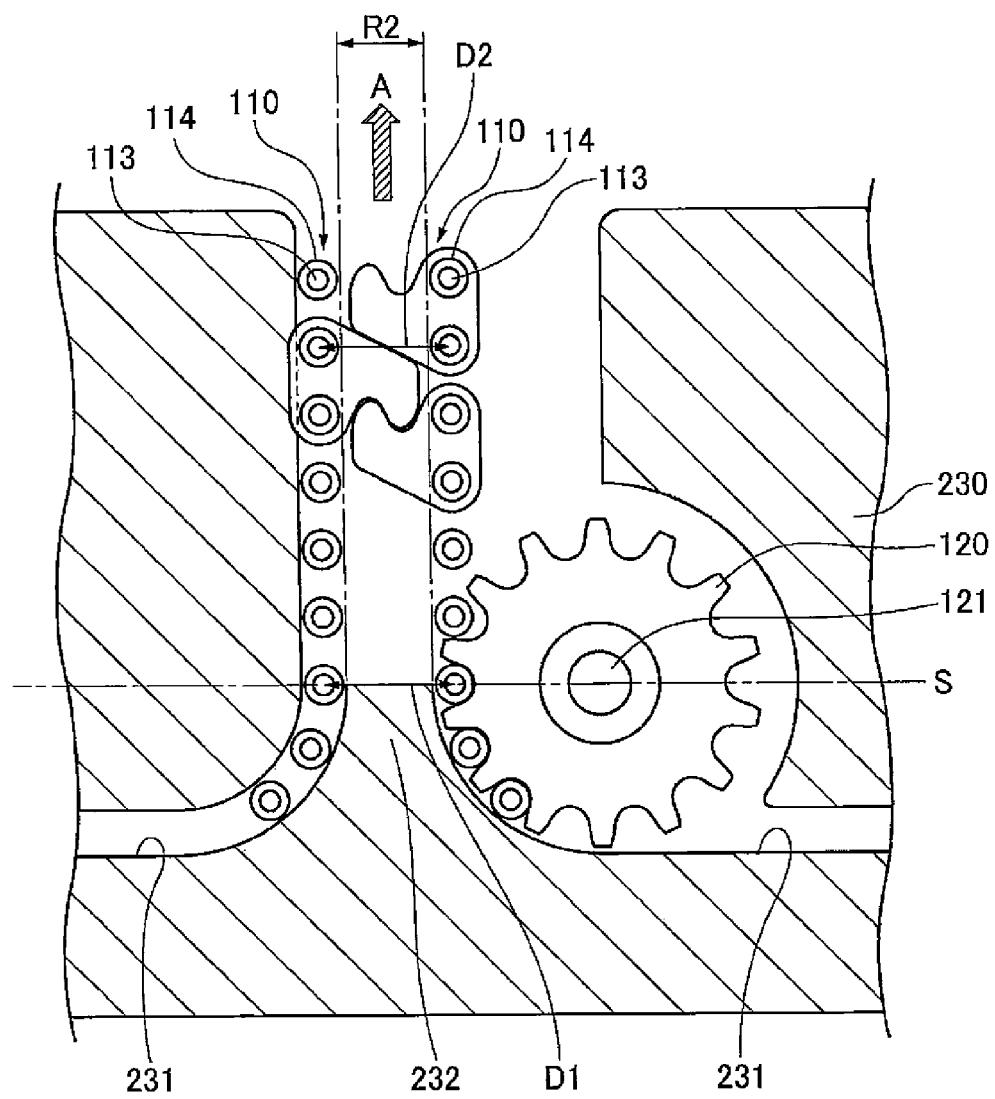
FIG. 6 is a partially enlarged view corresponding to FIG. 4, illustrating a second modification.
Figure 7:
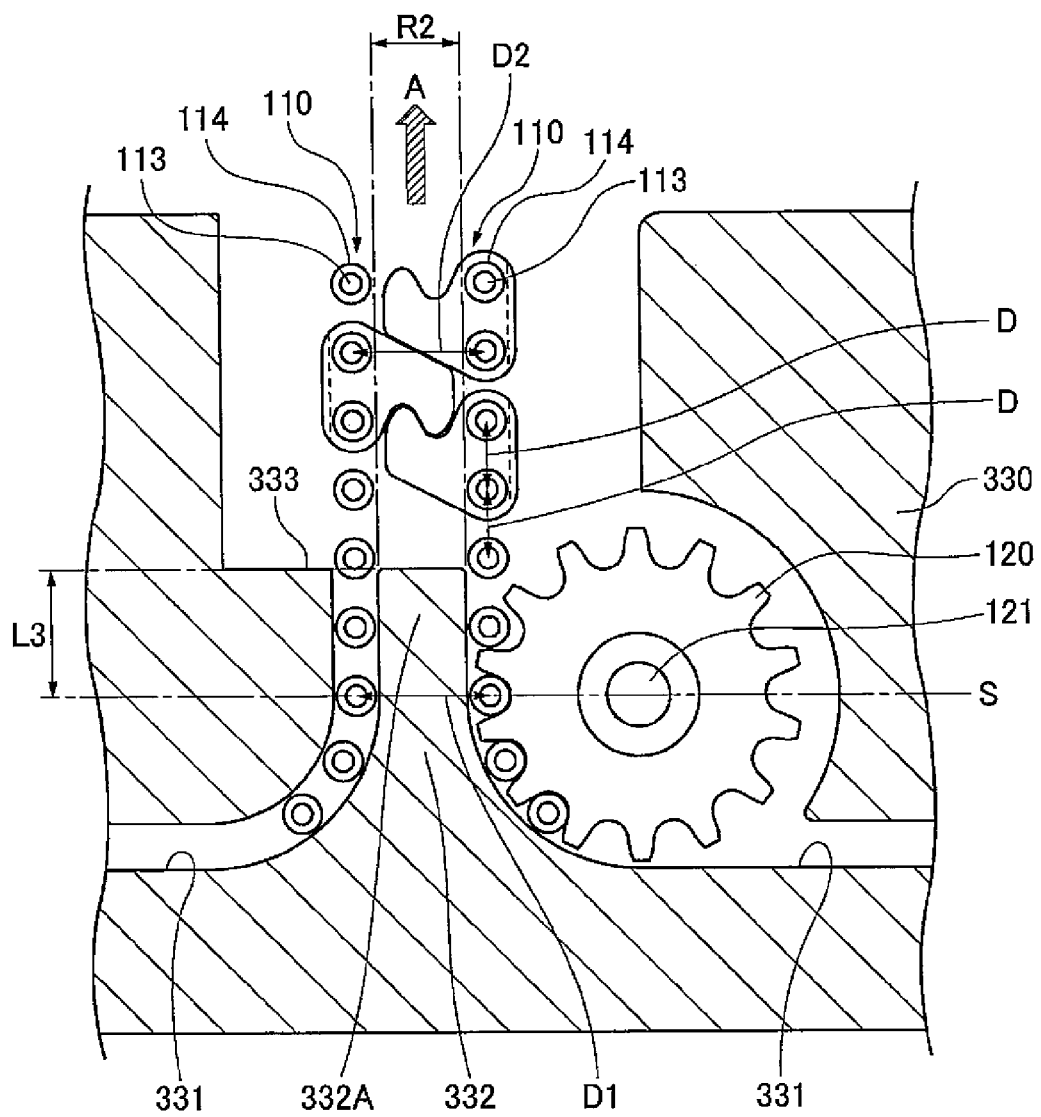
FIG. 7 is a partially enlarged view corresponding to FIG. 4, illustrating a third modification.
Figure 8:
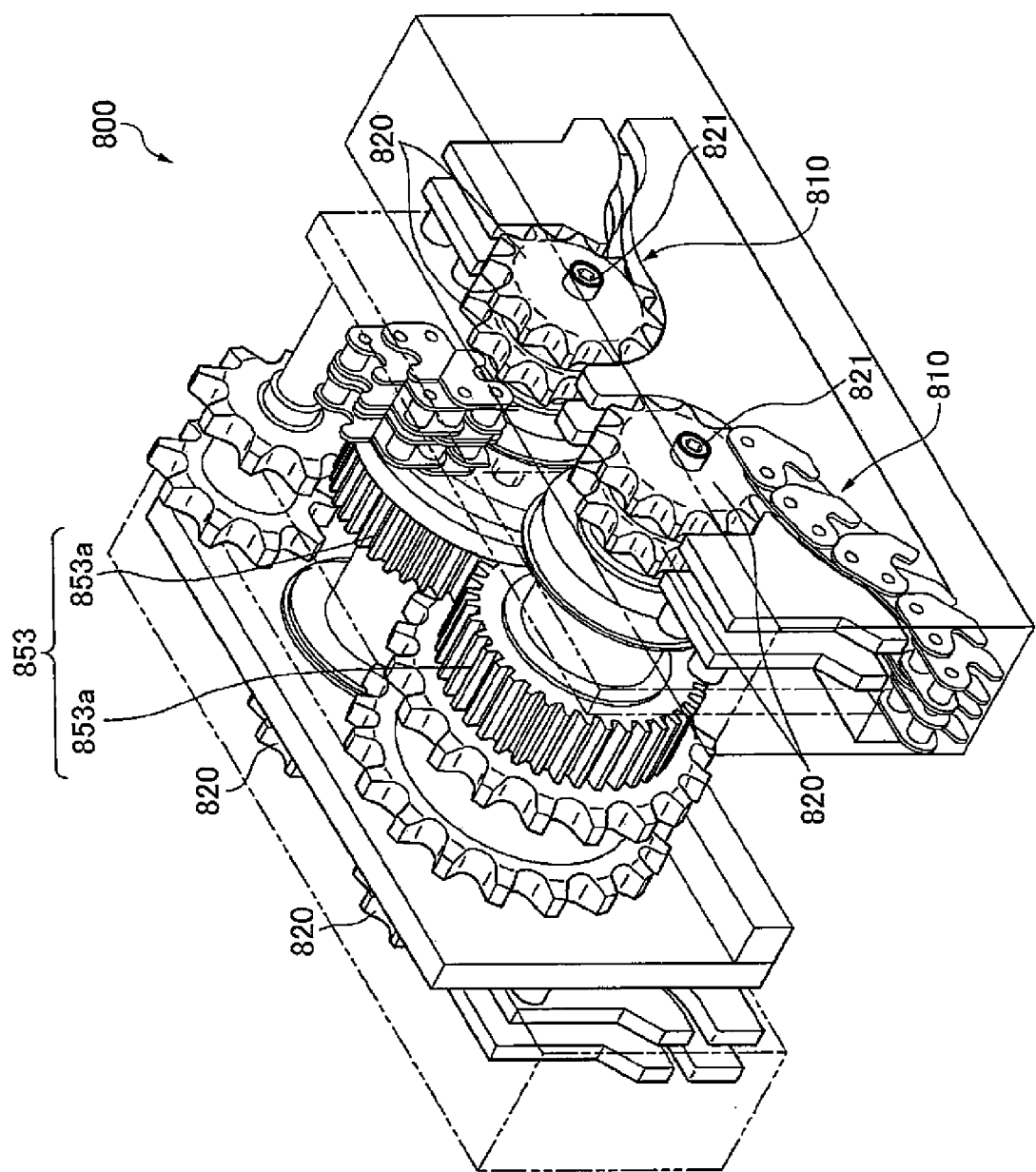
FIG. 8 is a partially enlarged view of a conventional interlocking chain type lifting apparatus.

FIG. 1 is a general perspective view of an interlocking chain type forward and backward actuating device according to one embodiment of the present invention. FIG. 2 is a partially enlarged view of the vicinity of a drive sprocket and interlocking chains shown in FIG. 1. FIG. 3 is a perspective view showing an exploded state and a disengaged state of the interlocking chains. FIG. 4 is a partially enlarged view of the vicinity of the drive sprocket and the interlocking chains shown in FIG. 1. FIG. 5 is a partially enlarged view corresponding to FIG. 4, illustrating a first modification. FIG. 6 is a partially enlarged view corresponding to FIG. 4, illustrating a second modification. FIG. 7 is a partially enlarged view corresponding to FIG. 4, illustrating a third modification.

First, an interlocking chain type forward and backward actuating device 100 according to one embodiment of the present invention vertically moves a driven body T, such as a lifting table on which a heavy material (not illustrated) as a workpiece is loaded, with respect to an installation face G as shown in FIG. 1.

The interlocking chain type forward and backward actuating device 100 according to the present embodiment includes, as shown in FIG. 1 to FIG. 3, a pair of interlocking chains 110, 110, a drive sprocket 120, and a chain guide 130. The interlocking chains 110, 110 are each composed by coupling, in the chain longitudinal direction, a great number of pairs of hook-shaped inner tooth plates 111 spaced from each other in the chain width direction and a great number of pairs of hook-shaped outer tooth plates 112 arranged adjacent to the outer sides of the hook-shaped inner tooth plates 111 in the chain width direction by pairs of front and rear connecting pins 113. The interlocking chains 110, 110 are integrally made rigid to form a rigid chain part 110G in a state where the interlocking chains 110, 110 are interlocked with each other and arranged to face each other. The interlocking chains 110, 110 are disengaged from each other to bifurcate. The drive sprocket 120 engages with a first one of the pair of interlocking chains 110, 110 from a side position of the pair of interlocking chains 110, 110 to freely advance and retreat the pair of interlocking chains 110, 110. The chain guide 130 has chain guide grooves 131, 131 that interlock a second one of the interlocking chains 110, 110 with the first interlocking chain 110 by a chain positioning guide portion 132 provided in the fork region R1 of the pair of interlocking chains 110, 110 to drive the second interlocking chain 110 so as to follow the first interlocking chain 110. The interlocking chain type forward and backward actuating device 100 advances and retreats a driven body T according to advancing/retreating movement of the pair of interlocking chains 110 and 110 on the base plate 140.

The interlocking chain type forward and backward actuating device 100 further includes a power transmission chain 151, which transmits power to a driven side sprocket 152 for rotating the drive sprocket 120, and a drive motor 150 as a drive source, which drives the power transmission chain 151. Motor torque of the drive motor 150 is transmitted without waste by directly supporting and pushing up the driven body T on which the workpiece is loaded by the pair of interlocking chains 110 and 110.

The drive sprocket 120 is designed to engage with bushings 114, which are part of the interlocking chains 110.

The pair of interlocking chains 110 and 110 used in the interlocking chain type forward and backward actuating device 100 are, as shown in FIG. 3, composed by coupling a great number of inner link units, which are each formed by press-fitting a pair of front and rear bushings 114 with the hook-shaped inner tooth plates 111 and 111 located in pairs and spaced from each other in the chain width direction W by pairs of front and rear connecting pins 113 press-fitted in pairs of front and rear pin holes of the hook-shaped outer tooth plates 112 located on the outermost side in the chain width direction W.

Next, the characteristic configuration of the interlocking chain type forward and backward actuating device 100 of the embodiment described above will be described in more detail with reference to FIGS. 1 to 4.

In the interlocking chain type forward and backward actuating device 100, as shown in FIG. 1 to FIG. 4, the connecting pins 113 of the first interlocking chain include a first connecting pin 113. The first connecting pin 113 is positioned on the drive sprocket side in a state where the first interlocking chain 110 is engaged with sprocket teeth of the drive sprocket 120 in a chain interlocking imaginary plane S that is orthogonal to the driving direction A of the rigid chain part 110G and includes a drive shaft 121 of the drive sprocket 120. The connecting pins 113 of the second interlocking chain 110 include a second connecting pin 113 facing the first connecting pin 113 along the chain interlocking imaginary plane S. A distance that exists between the first connecting pin 113 and the second connecting pin 113 is defined as an interlocked-state pin-to-pin distance D1. The connecting pins 113 in the rigid chain part 110G include a pair of connecting pins 113 facing each other while being parallel to the chain interlocking imaginary plane S. A distance that exists between these pins 113 is defined as a rigid-state pin-to-pin distance D2. The chain guide grooves 131 are formed such that the interlocked-state pin-to-pin distance D1 is equal to the rigid-state pin-to-pin distance D2. The pair of interlocking chains 110 and 110 are driven by the drive sprocket 120 engaged with the first interlocking chain 110 to mesh the hook-shaped inner tooth plates 111 with each other and mesh the hook-shaped outer tooth plates 112 with each other, respectively, and the pair of interlocking chains 110 and 110 are driven as they are in the rigid chain direction A to smoothly complete the movement for meshing between the hook-shaped inner tooth plates 111 and the movement for meshing between the hook-shaped outer tooth plates 112. Thus, an increase in work burden on actuator assembly, adjustment of rotation phases, and maintenance is avoided. Also, the driven body T is smoothly advanced and retreated near the installation surface. Further, occurrence of pulsation (up-down movement), vibration, noise, and speed fluctuation of the interlocking chains 110 is avoided.

In the interlocking chain type forward and backward actuating device 100, the chain positioning guide portion 132 extends straight to a hollow region R2 of the rigid chain part 110G. Thus, the chain positioning guide portion 132 supports not only chain disengaged portions bifurcated by disengagement from each other between the pair of interlocking chains 110 and 110, but also the rigid chain part 110G in which the pair of interlocking chains 110 and 110 are interlocked with each other and made rigid. Accordingly, occurrence of pulsation (up-down movement), vibration, noise, and speed fluctuation of the interlocking chains 110 is more reliably avoided by guiding the pair of interlocking chains 110 and 110 until the pair of interlocking chains 110 and 110 are made rigid from the state where the chains are disengaged from each other.

In the interlocking chain type forward and backward actuating device 100, the length L of the straight extending portion 132A extending to the hollow region R2 from the chain engagement imaginary plane S of the chain positioning guide portion 132 is equal to or longer than a pin-to-pin distance D between the pair of front and rear connecting pins 113. Thus, the straight extending portion 132A supports the rigid chain part 110G in a range of the pin-to-pin distance D between the pair of front and rear connecting pins 113. Accordingly the interlocking chains 110 are more smoothly driven. Also, occurrences of pulsation (up-down movement), vibration, noise, and speed fluctuation of the interlocking chains 110 are more reliably avoided as compared with the case where the pair of interlocking chains 110 and 110 are guided only in a range until the pair of interlocking chains 110 and 110 are interlocked with each other.

As described above, the pair of interlocking chains 110 and 110 are configured to have the following features. That is, the connecting pins 113 of the first interlocking chain include a first connecting pin 113. The first connecting pin 113 is positioned on the drive sprocket side in a state where the first interlocking chain 110 is engaged with sprocket teeth of the drive sprocket 120 in a chain interlocking imaginary plane S that is orthogonal to the driving direction A of the rigid chain part 110G and includes a drive shaft 121 of the drive sprocket 120. The connecting pins 113 of the second interlocking chain 110 include a second connecting pin 113 facing the first connecting pin 113 along the chain interlocking imaginary plane S. A distance that exists between the first connecting pin 113 and the second connecting pin 113 is defined as an interlocked-state pin-to-pin distance D1. The connecting pins 113 in the rigid chain part 110G include a pair of connecting pins 113 facing each other while being parallel to the chain interlocking imaginary plane S. A distance that exists between these pins 113 is defined as a rigid-state pin-to-pin distance D2. The chain guide grooves 131 are formed such that the interlocked-state pin-to-pin distance D1 is equal to the rigid-state pin-to-pin distance D2. Therefore, the interlocking chain type forward and backward actuating device 100 according to the present embodiment achieves significant advantages. Specifically, an increase in work burden on actuator assembly, adjustment of rotation phases, and maintenance is avoided. Also, the driven body T is smoothly advanced and retreated near the installation surface. Further, occurrence of pulsation (up-down movement), vibration, noise, and speed fluctuation of the interlocking chains 110 is avoided.

Next, modifications of the above-described interlocking chain type forward and backward actuating device 100 will be described with reference to FIGS. 5 to 7.

In the following first to third modifications, components common to those of the above-described interlocking chain type forward and backward actuating device 100 are provided with common reference symbols, and detailed description thereof is omitted.

As shown in FIG. 5, in the interlocking chain type forward and backward actuating device according to a first modification, the length L1 of the straight extending portion 132A is twice or more as long as the pin-to-pin distance D between the pair of front and rear connecting pins 113. Thus, the side surface of a straight extending portion 132A is made to face three or more connecting pins 113 in the rigid chain direction A to support these connecting pins 113 directly or indirectly via bushings 114 or rollers. Accordingly, the interlocking chains 110 are more reliably and smoothly driven and occurrence of pulsation (up-down movement), vibration, noise, and speed fluctuation of the interlocking chains 110 is more reliably avoided.

Lubricant may be stored in recesses and grooves partially provided on the side surface, that is, the surface facing the bushings 114 of the straight extending portion 132A to reduce noise during chain driving, and the wear resistance of the bushings may be improved.

As shown in FIG. 6, in the interlocking chain type forward and backward actuating device according to a second modification, the pair of interlocking chains 110 and 110 are formed such that the interlocked-state pin-to-pin distance D1 and the rigid-state pin-to-pin distance D2 are equal to each other. Thus, the drive sprocket 120 and a chain guide 230 forming a side wall facing the interlocking chain 110 on the side opposite to the drive sprocket 120 drive the rigid chain part 110G in the rigid chain direction A without disengagement of the rigid chain part. Accordingly, the pair of interlocking chains 110 and 110 are smoothly driven, and occurrence of pulsation (up-down movement), vibration, noise, and speed fluctuation of the interlocking chains 110 is reliably avoided.

As shown in FIG. 7, in the interlocking chain type forward and backward actuating device according to a third modification, the pair of interlocking chains 110 and 110 are formed such that the interlocked-state pin-to-pin distance D1 and the rigid-state pin-to-pin distance D2 become equal to each other. Thus, the drive sprocket 120 and the chain guide groove 331 that forms a side wall facing the interlocking chain 110 on the side opposite to the drive sprocket 120 and has an opening edge 333 at the height equal to the height of the tip end of the straight extending portion 332A guide the pair of interlocking chains 110 and 110 from both sides. Therefore, the pair of interlocking chains 110 and 110 are smoothly driven and occurrence of pulsation (up-down movement), vibration, noise, and speed fluctuation of the interlocking chains 110 is reliably avoided.

Description of the Reference Numerals

100 . . . interlocking chain type forward and backward actuating device
110 . . . interlocking chain
110G . . . rigid chain part
111 . . . hook-shaped inner tooth plate
112 . . . hook-shaped outer tooth plate
113 . . . connecting pin
114 . . . bushing
120 . . . drive sprocket
121 . . . drive shaft
130, 230, 330 . . . chain guide
131, 231, 331 . . . chain guide groove
132, 232, 332 . . . chain positioning guide portion
132A, 332A . . . straight extending portion
140 . . . base plate
150 . . . drive motor
151 . . . power transmission chain
152 . . . driven side sprocket
800 . . . interlocking chain type lifting apparatus
810 . . . interlocking chain
A . . . rigid chain direction
D . . . pin-to-pin distance between pair of front and rear connecting pins
D1 . . . Interlocked-state pin-to-pin distance
D2 . . . Rigid-state pin-to-pin distance
G . . . installation surface
L, L1, L3 . . . length of straight extending portion
R1 . . . fork region of pair of interlocking chains
R2 . . . hollow region of rigid chain part
S . . . chain engagement imaginary plane
T . . . driven body

The invention claimed is:

1. An interlocking chain type forward and backward actuating device, comprising:
a first chain comprising at least one pair of spaced hook-shaped inner tooth plates and at least one pair of hook-shaped outer tooth plates, each of the outer tooth plates being positioned with front and rear connecting pins adjacent to an outer surface of the hook-shaped inner tooth plates;
a second chain comprising at least one pair of spaced hook-shaped inner tooth plates and at least one pair of hook-shaped outer tooth plates, each of the outer tooth plates being positioned with front and rear connecting pins adjacent to an outer surface of the hook-shaped inner tooth plates;
a drive sprocket;
a chain guide;

wherein the first chain and the second chain are interconnected to form interlocking chains by coupling the at least one pair of hook-shaped inner tooth plates of the first chain to the at least one pair of hook-shaped inner tooth plates of the second chain, and by coupling the at least one pair of hook-shaped outer tooth plates of the first chain to the at least one pair of hook-shaped outer tooth plates of the second chain;

wherein the first and second chains are integrally made rigid to form a rigid chain part in a state where the interlocking chains are interlocked with each other and arranged to face each other, and wherein the interlocking chains have a longitudinal axis that is parallel to a chain driving direction;

wherein the drive sprocket engages a portion of the first chain to freely advance and retreat the interlocking chains;

wherein the chain guide has chain guide grooves that interlock the second chain to the first chain with a chain positioning guide portion provided in a forked region of the interlocking chains, such that the second chain follows the first chain;

wherein the front and rear connecting pins of the first chain include a first connecting pin;

wherein the first connecting pin of the first chain is positioned on the drive sprocket and positioned in a chain interlocking imaginary plane when the first chain is engaged with sprocket teeth of the drive sprocket, the chain interlocking imaginary plane being orthogonal to the driving direction of the rigid chain part and including a drive shaft of the drive sprocket;

wherein the front and rear connecting pins of the second chain include a second connecting pin that corresponds with the first connecting pin, and is positioned along the chain interlocking imaginary plane;

wherein a distance that exists between the first connecting pin and the second connecting pin is defined as an interlocked-state pin-to-pin distance;

wherein the front and rear connecting pins of the first and second chains in the rigid chain part face each other and are parallel to the chain interlocking imaginary plane, a distance that exists between the first and second connecting pins in the rigid chain part being defined as a rigid-state pin-to-pin distance; and wherein the chain guide grooves are formed such that the interlocked-state pin-to-pin distance is equal to the rigid-state pin-to-pin distance.

2. The interlocking chain type forward and backward actuating device according to claim 1, wherein the chain positioning guide portion extends straight to a hollow region of the rigid chain part.

3. The interlocking chain type forward and backward actuating device according to claim 2, wherein the length of the straight extending portion extending to the hollow region from the chain engagement imaginary plane of the chain positioning guide portion is equal to or longer than a pin-to-pin distance between the pair of front and rear connecting pins.

4. The interlocking chain type forward and backward actuating device according to claim 3, wherein the length of the straight extending portion is twice or more as long as the pin-to-pin distance between the pair of front and rear connecting pins.

* * * * *